Jan. 11, 1944. M. G. CLAY ET AL 2,339,001
MOLDING MACHINE
Filed Aug. 23, 1940 10 Sheets-Sheet 1
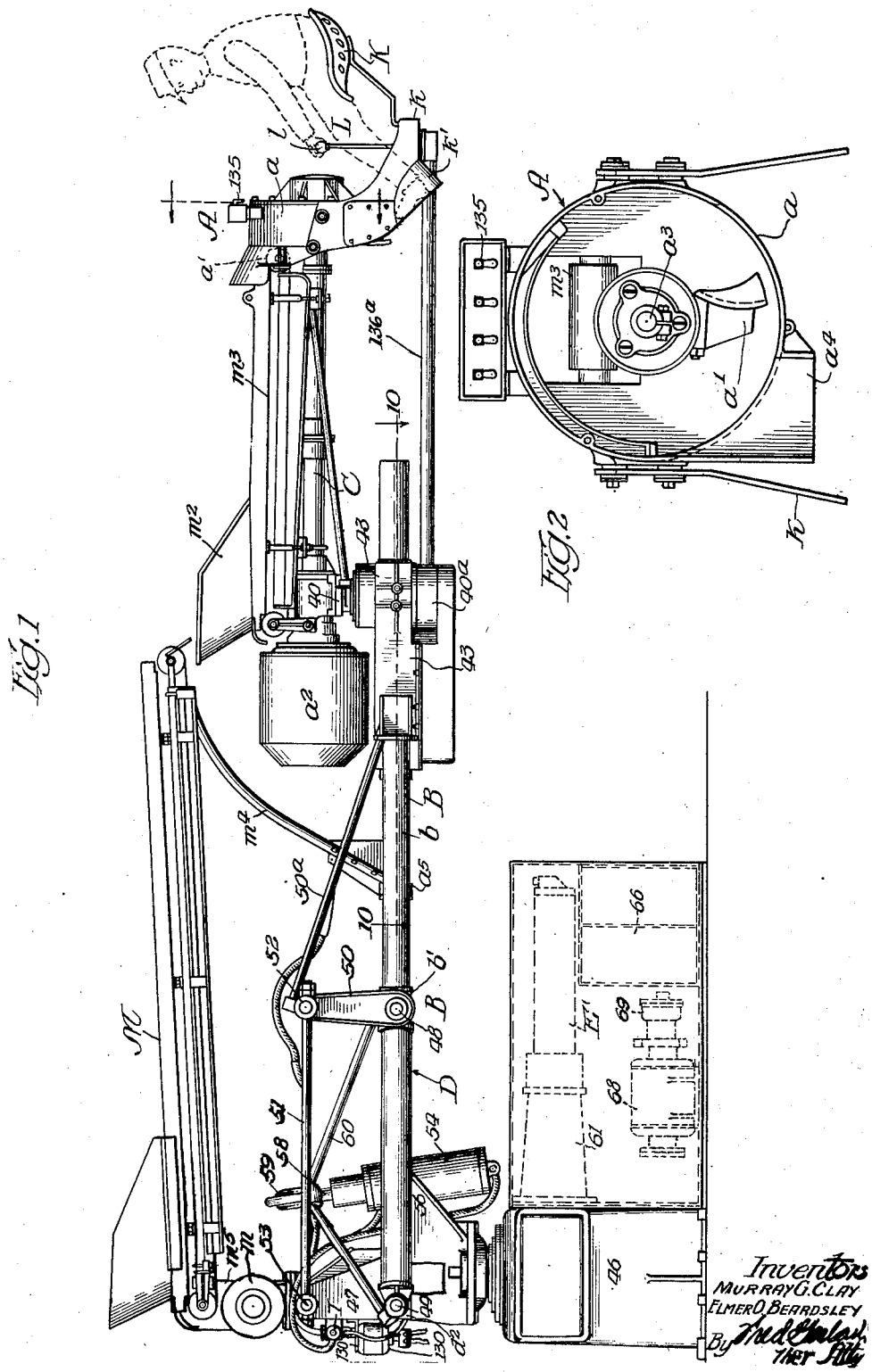

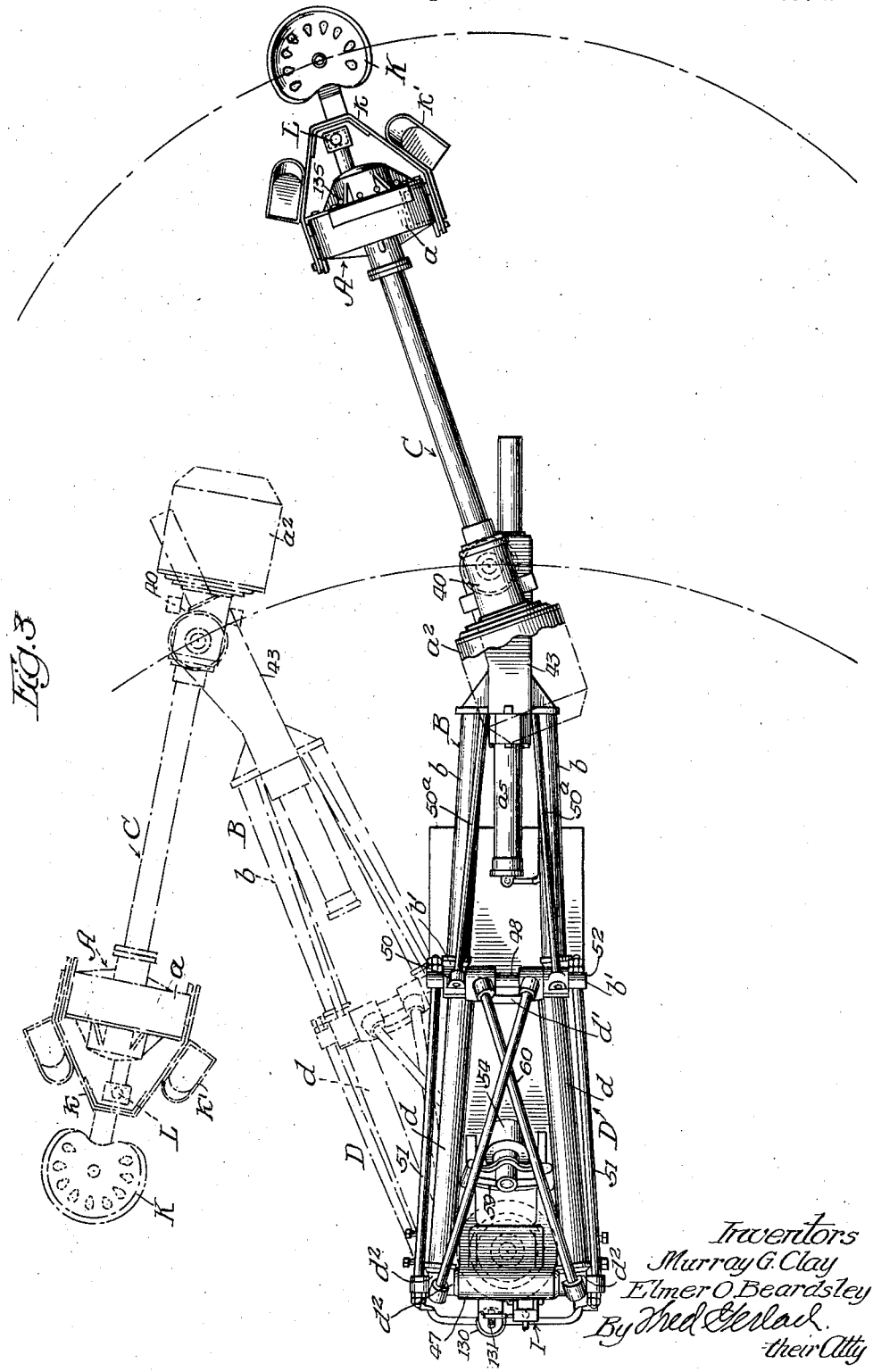

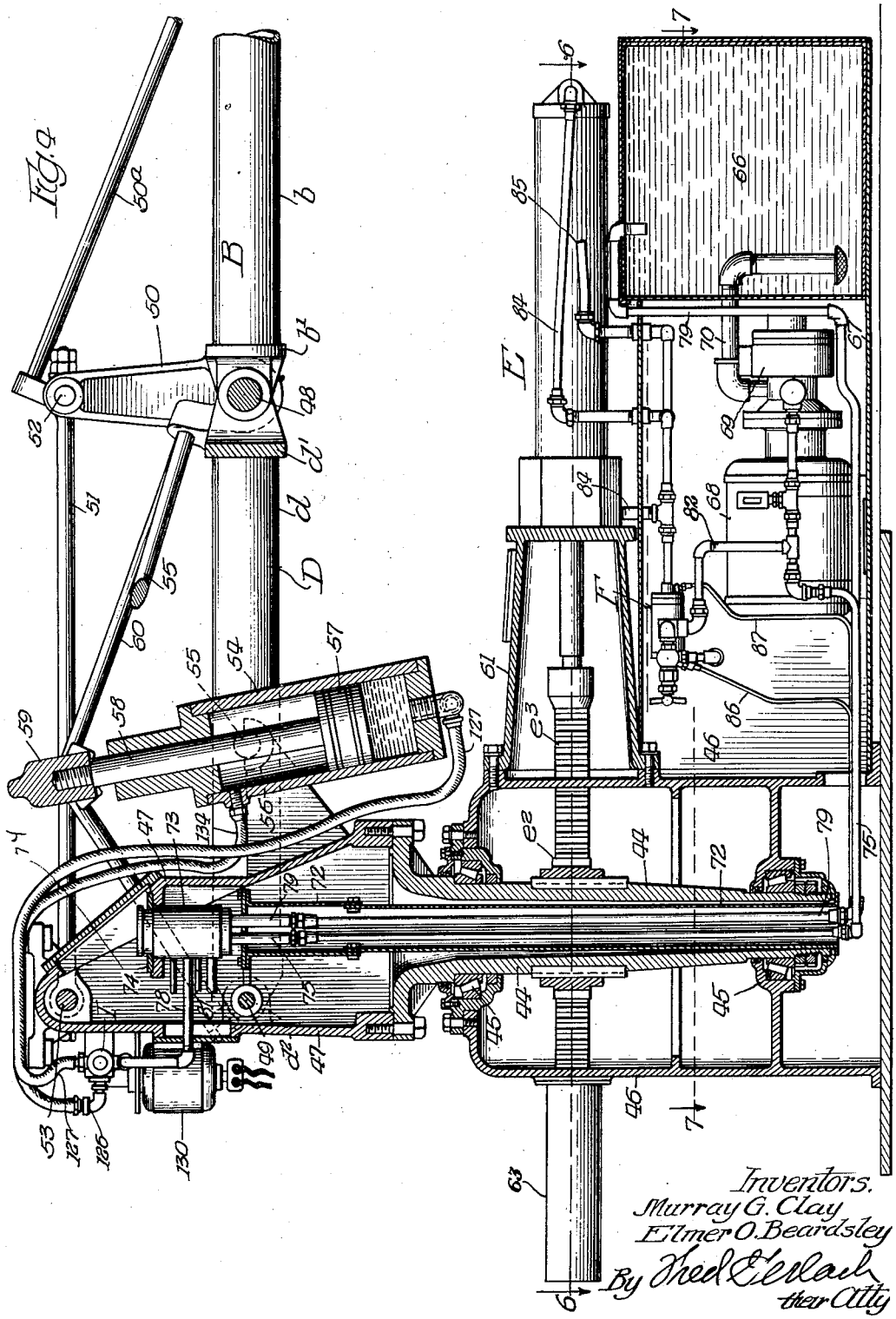

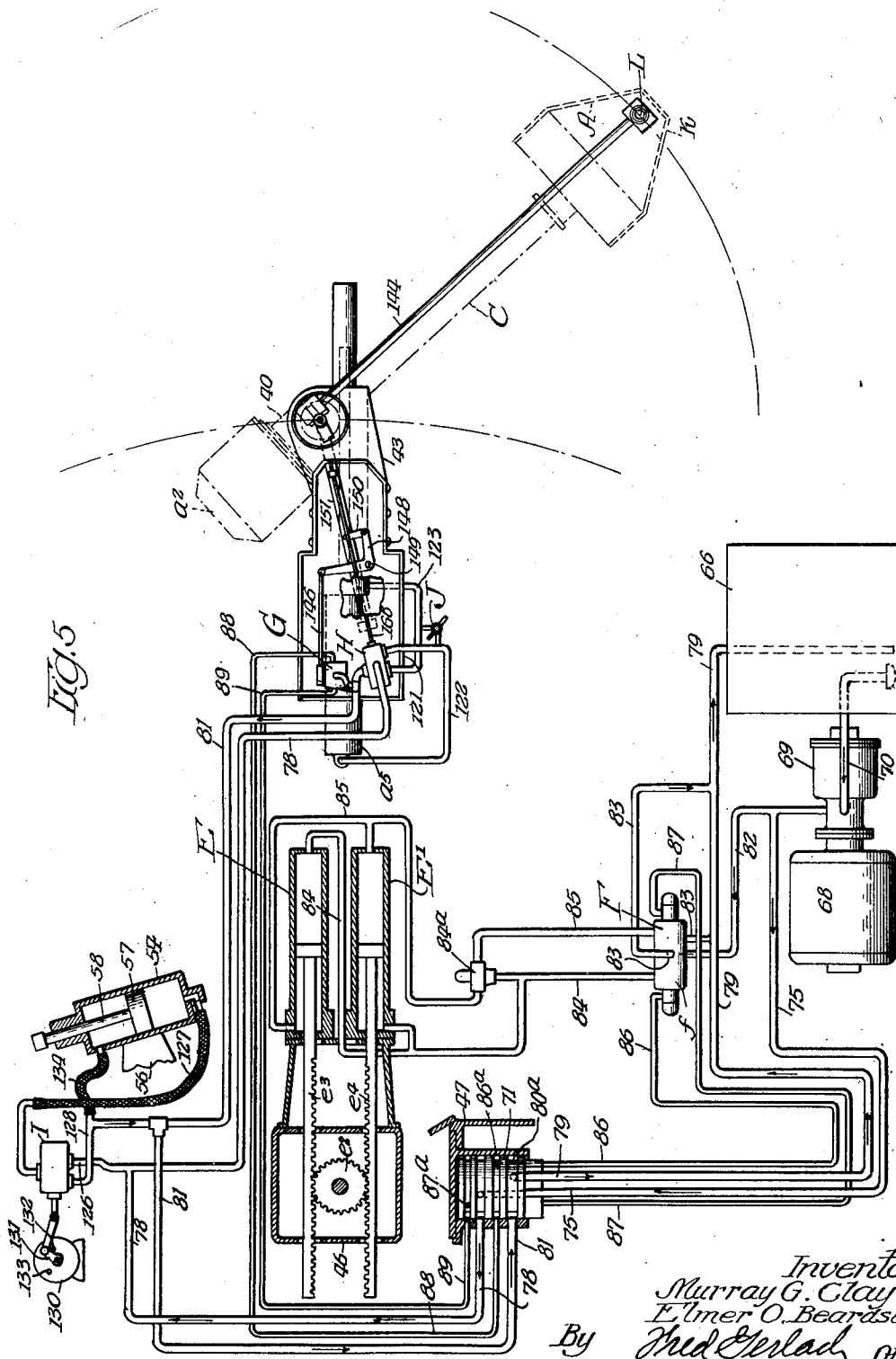

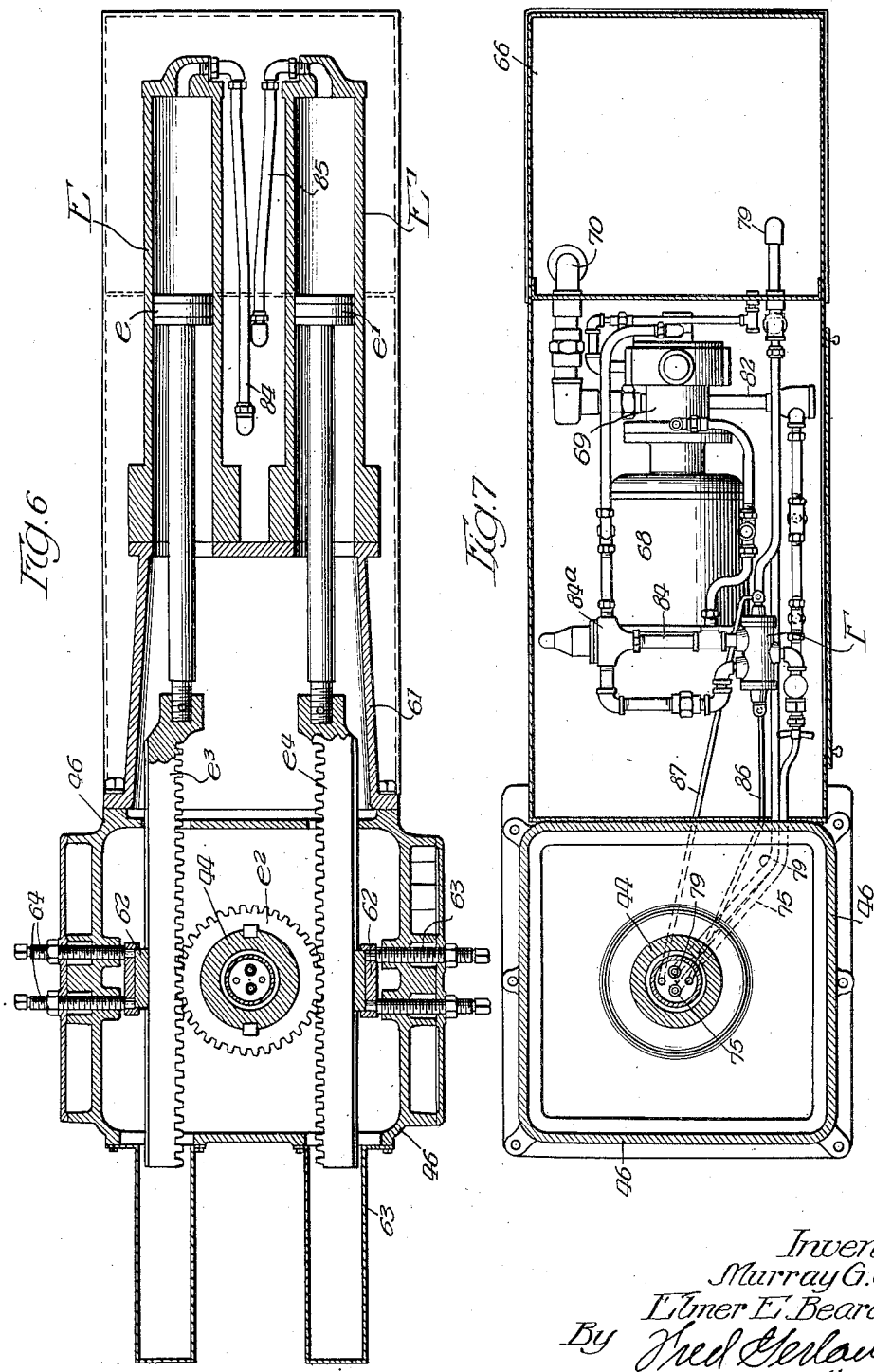

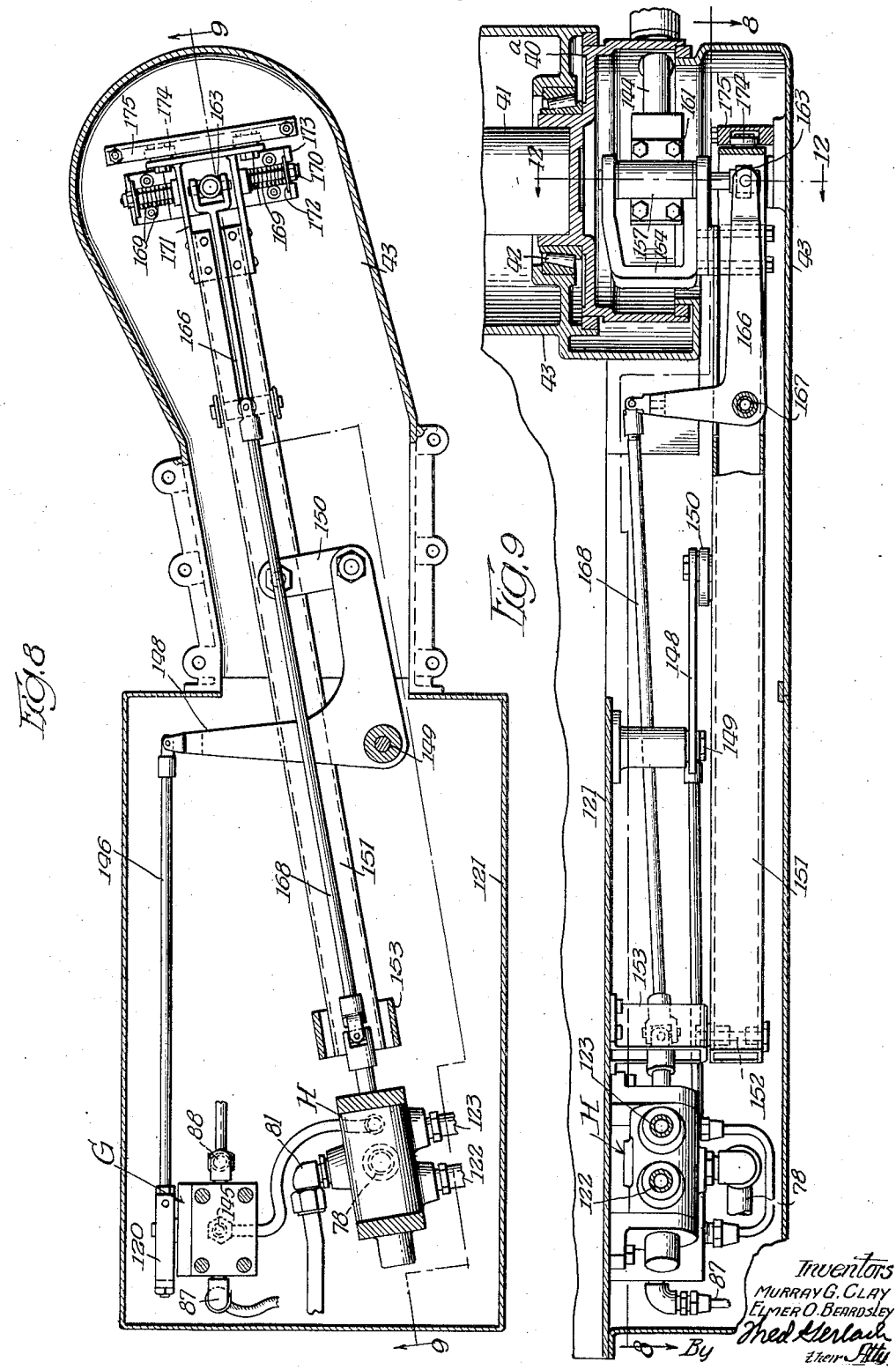

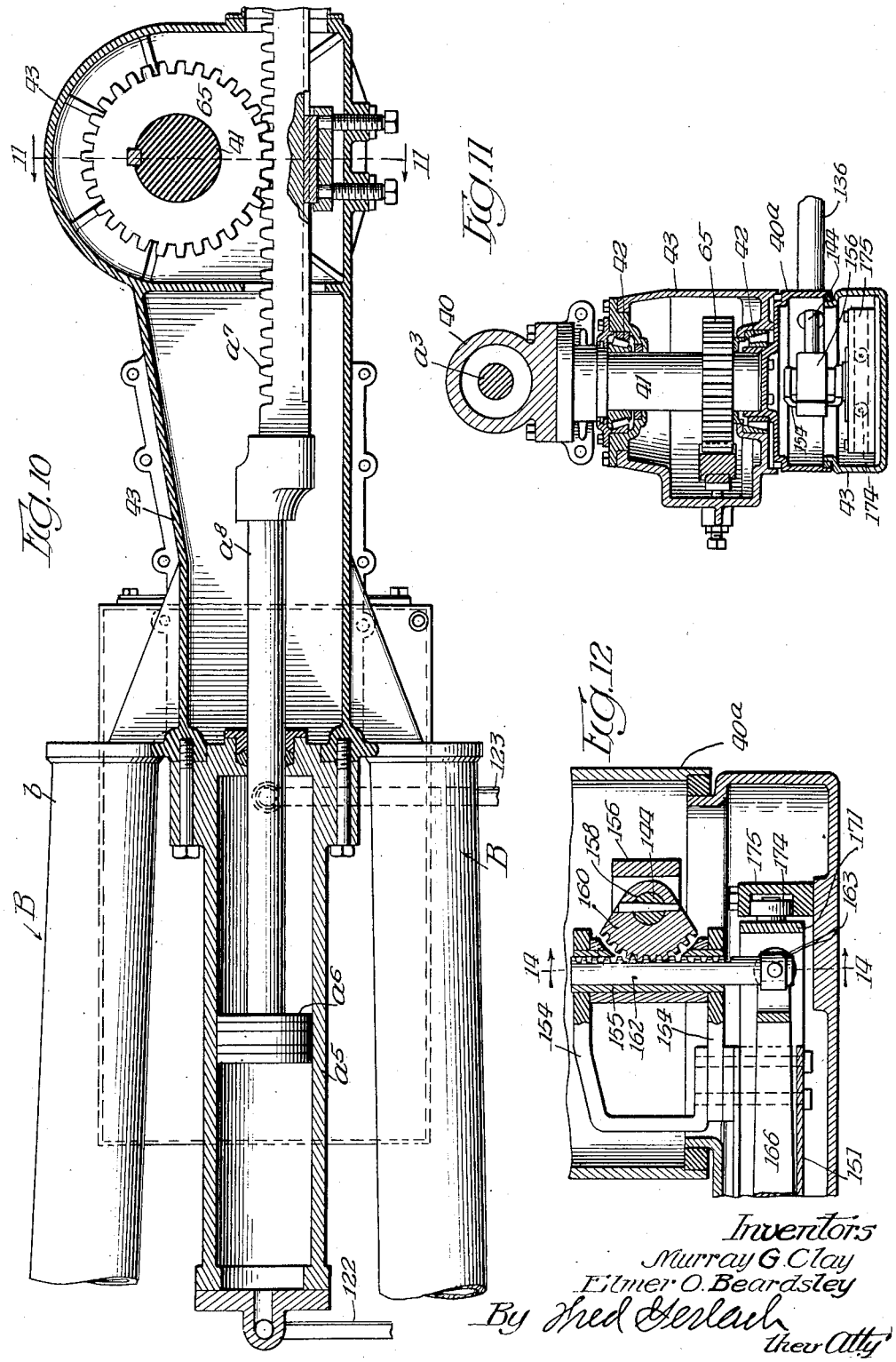

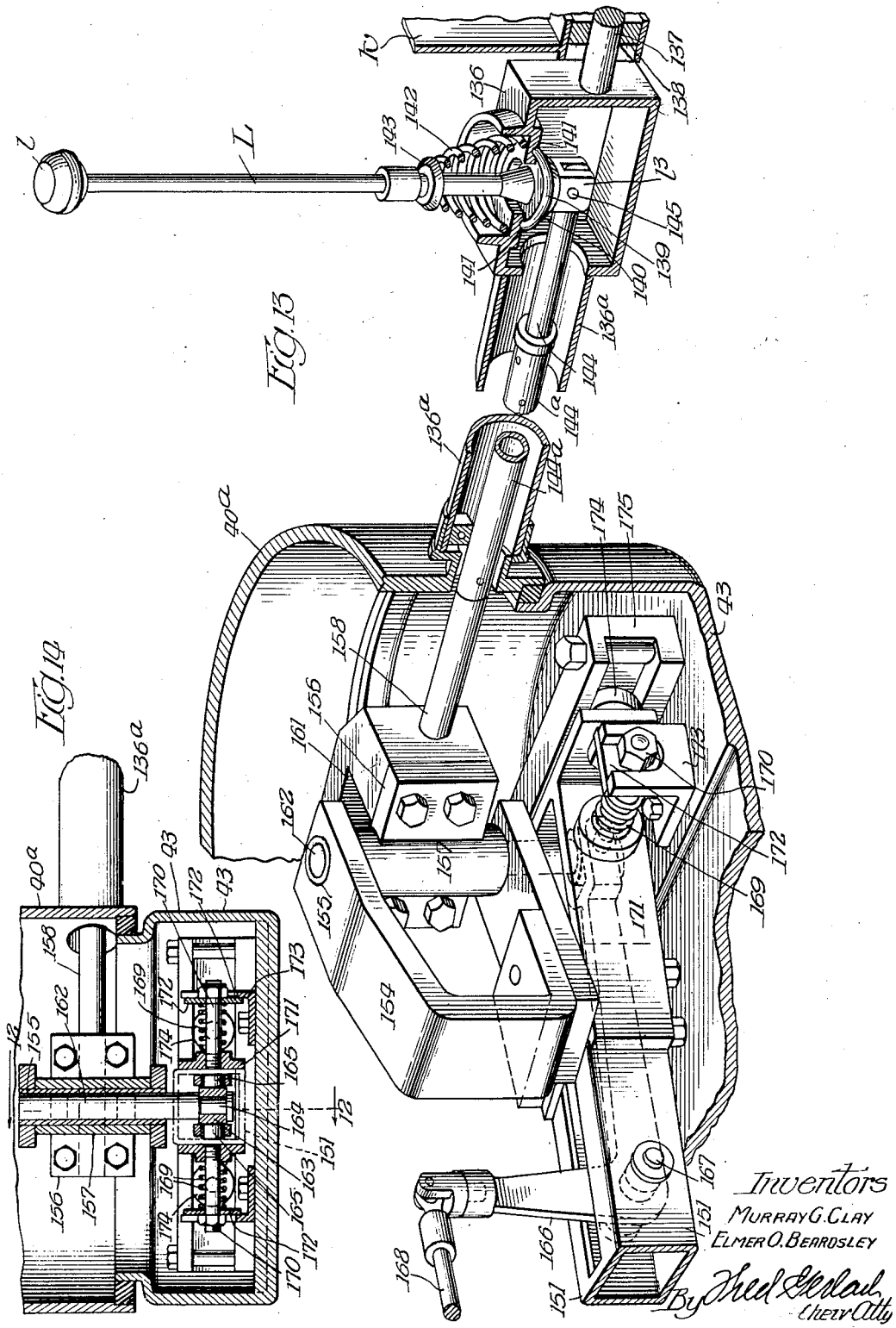

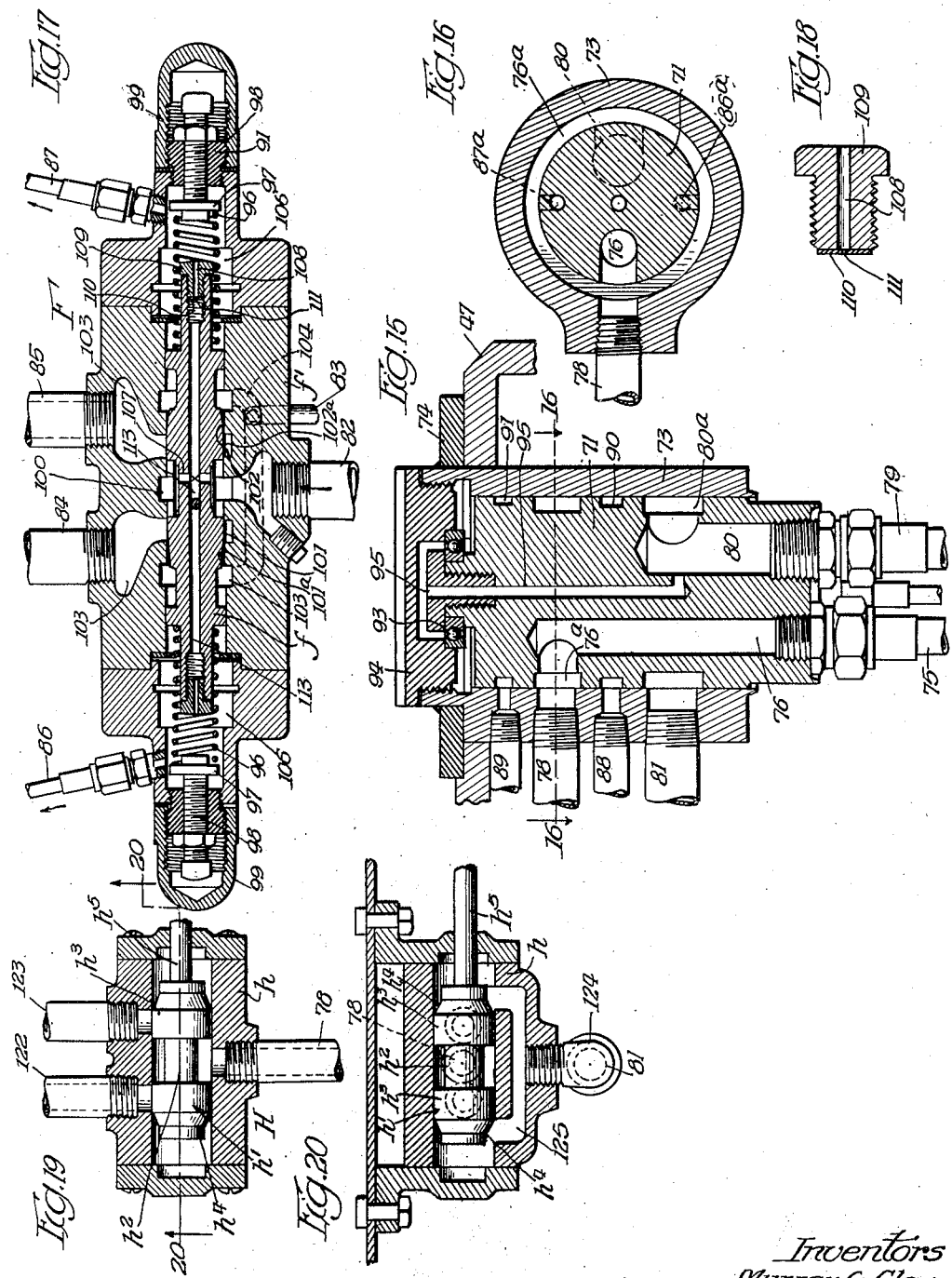

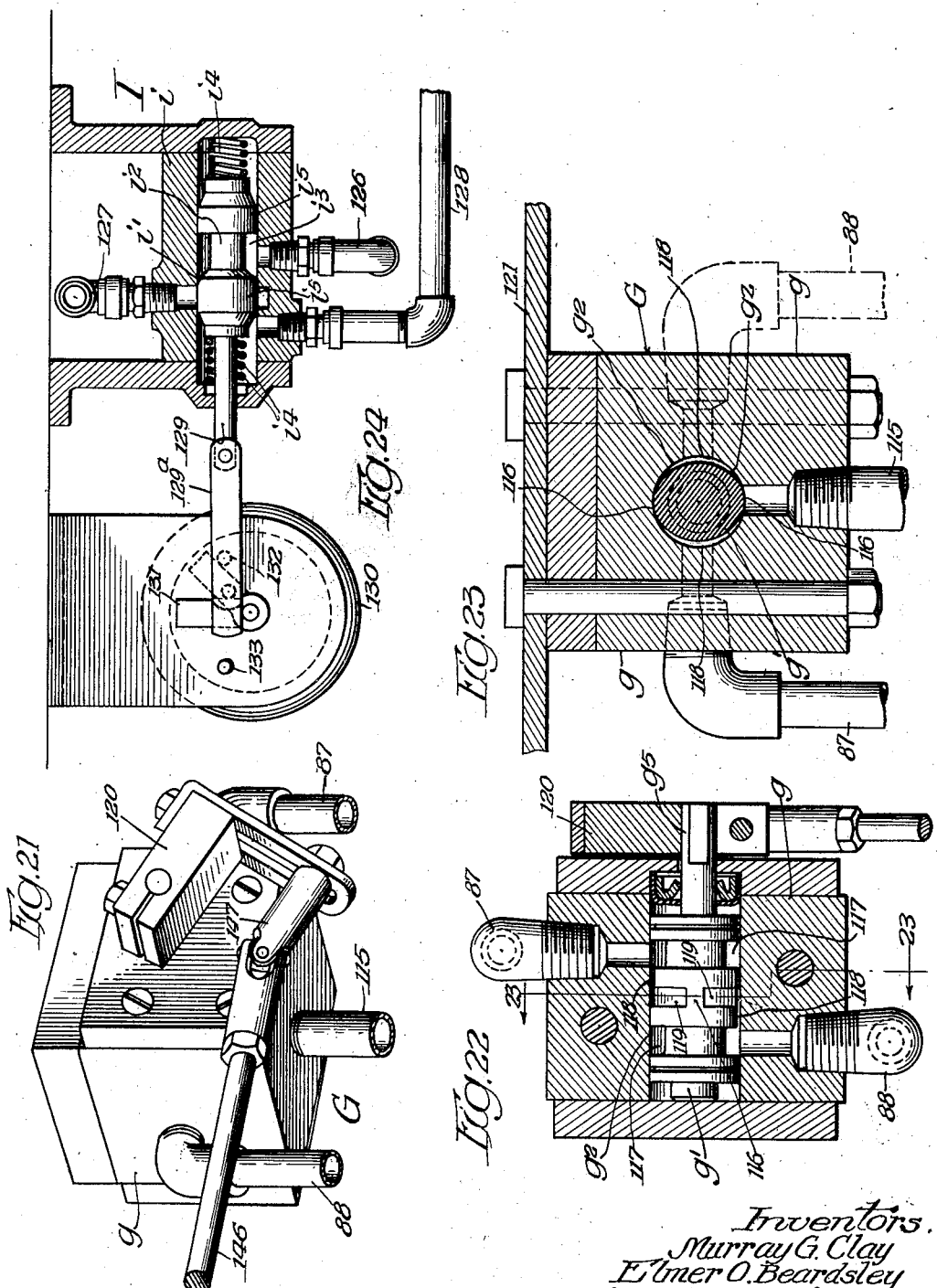

Patented Jan. 11, 1944

2,339,001

UNITED STATES PATENT OFFICE 2,339,001

MOLDING MACHINE

Murray G. Clay and Elmer O. Beardsley, Chicago, Ill., assignors to The Beardsley & Piper Company, Chicago, Ill., a corporation of Illinois Application August 23, 1940, Serial No. 353,882

12 Claims. (Cl. 22—36)

The invention relates to controlling mechanism for power-operated mechanism for moving sand projectors over flasks.

In the use of sand projectors which are movable over flasks of great area and which are supported by a jointed structure comprising members of considerable length, in order to ram sand in all portions of the flask, it is difficult for an operator to manually move the projector and its supporting structure. A desideratum is to use projectors of sufficient capacity for slinging large quantities of sand, which requires heavy projectors and supports. Such heavy apparatus requires such great manual force in moving the projector over the flask that operators can not endure the strain of the work for long periods. Another desideratum is to provide a power-operated supporting structure for the projector and the operator, whereby the operator will be seated above and close to the line of discharge of the sand so he can readily observe the deposit into the flask and selectively control the movements of the projector for uniform distribution into all portions of the flasks.

One object of the invention is to provide a single manually operable control device for hydraulic shifting mechanism for the projector whereby the operator may easily and selectively control the horizontal movement of the projector in any direction over flasks of great area in all regular or irregular movements necessary to ram different flasks. This object is attained primarily by providing valve mechanisms for controlling the elements of the members of the jointed supporting structure from a single lever to which said mechanisms are connected for individual and compound operation responsive to the direction in which the lever is shifted by the operator.

Another object of the invention is to provide a sand projector which is movable by power in any direction and includes a control device and an operator's seat or support which is located at and movable with the projector so the operator can readily observe the ramming of the sand into the flasks.

Another object of the invention is to provide control mechanism of this type in which the valve mechanisms control the movements of the members of the jointed structure for quick response to the movements of the control lever without imparting severe shocks to the members in sudden changes in the direction of the movement of said members.

Another object of the invention is to provide hydraulically operated shifting mechanism for the jointed supported structure for the sand-projector which includes pipe connections for supplying oil under pressure from a stationary supply to the control devices and the cylinder which are movable with a member of the supporting structure through a full circle.

Another object of the invention is to provide hydraulically operated mechanism for raising and lowering the jointed supporting structure for the projector.

Another object of the invention is to provide improved control means for hydraulically operated mechanism for shifting the projector horizontally in any direction over flasks.

Other objects of the invention will appear from the detail description.

The invention consists in the several novel features hereinafter set forth and more particularly defined by claims at the conclusion hereof.

In the drawings:

Fig. 1 is a side elevation of a machine embodying the invention, some of the pipe connections being omitted.

Fig. 2 is an end view of the sand projector, the head at the outer side thereof being removed.

Fig. 3 is a plan of the supporting jib and arm and the projector, parts being omitted or broken away for illustrative purposes.

Fig. 4 is a vertical section taken longitudinally of the jib and through the stationary base and the rotatable housing by which the jib is supported.

Fig. 5 is a diagrammatic view of the hydraulic devices for shifting the supporting jib and arm, illustrating the control valves, the mechanism for supplying oil under pressure to said devices and the various pipe connections.

Fig. 6 is a horizontal section taken on line 6—6 of Fig. 4.

Fig. 7 is a horizontal section taken on line 7—7 of Feb. 4.

Fig. 8 is a horizontal section taken on line 8—8 of Fig. 9.

Fig. 9 is a section taken on line 9—9 of Fig. 8.

Fig. 10 is a horizontal section taken on line 10—10 of Fig. 1.

Fig. 11 is a section taken on line 11—11 of Fig. 10.

Fig. 12 is a section taken on line 12—12 of Fig. 9.

Fig. 13 is a sectional perspective of the manually operable devices of the control mechanism for controlling the control valves.

Fig. 14 is a section taken on line 14 of Fig. 12.

Fig. 15 is a vertical section of the swivel connection for the oil lines in the jib supporting housing.

Fig. 16 is a section taken on line 16—16 of Fig. 15.

Fig. 17 is a longitudinal section of the pilot-controlled valve for controlling the operation of the hydraulic mechanism for swinging the supporting jib.

Fig. 18 is a detail section of the plug for restricting the flow through the valve piston of the valve shown in Fig. 17.

Fig. 19 is a section of the valve for controlling the operation of the hydraulic device for swinging the supporting arm which is pivoted on the jib.

Fig. 20 is a section taken on line 20—20 of Fig. 19.

Fig. 21 is a perspective of the pilot valve for controlling the valve which controls the hydraulic devices for swinging the supporting jib.

Fig. 22 is a horizontal section through said pilot-valve.

Fig. 23 is a section taken on line 23—23 of Fig. 22.

Fig. 24 is a section illustrating the valve for controlling the hydraulic device for raising and lowering the jib and parts carried thereby.

The invention is exemplified in apparatus for slinging sand into flasks by means of rotary projector A which comprises a casing $a$ provided with an inlet in its inner side and a discharge spout $a^4$, a rotary blade $a'$ which slings wads of sand through spout $a^4$, and is fixed to, and driven at high speed by, the shaft $a^3$ of an electric motor $a^2$ which is supported for horizontal movement with the projector. The projector is supported for horizontal movement over flasks in any direction to project wads of sand at high speed into all portions of large flasks by a jointed structure comprising a pair of pivotally supported members, such as a jib B and an arm C. Jib B is pivotally supported for horizontal movement on a standard and arm C is pivotally supported for horizontal movement on the distal end of jib B so that either the jib or the arm may be moved to shift the projector, and their swinging movements may be compounded to bring the projector over all portions of the flask. Arm C is tubular and projector-casing $a$ is fixed to the outer end of said arm. Electric motor $a^2$ which drives the projector is mounted on the inner end of arm C. Arm C comprises a bracket 40 at its inner end and a spindle 41 (Fig. 11) is fixed to, and depends from, brackets 40. Spindle 41 is journaled for rotation in roller bearings 42 which are mounted in a housing 43 which is fixed to the outer end of jib B. A housing 40$^a$ is fixed to the lower end of spindle 41 and rotates with arm C. The jib B comprises an inner section D and is supported for horizontal rotation by a sleeve 44 (Fig. 4) which is journaled for horizontal rotation in roller-bearings 45 which are carried by a hollow standard or base 46. A housing-bracket 47 is fixedly secured to the upper end of sleeve 44. The jib B and the parts carried thereby, including arm C and projector A, are vertically movable by section D which is supported on bracket 47 for vertical movement to raise and lower the projector for different heights of flasks. Jib B comprises a pair of divergent tubular members $b$ (Fig. 3), the outer ends of which are fixedly secured to lugs on housing 43. The inner ends of members $b$ have affixed thereto bearings $b'$ which are carried by a cross-shaft 48. Shaft 48 is pivotally supported for vertical movement by the outer end of member D which comprises a pair of divergent tubular members $d$. The outer ends of members $d$ are rigidly cross-connected by a pivot-bracket $d'$ in which shaft 48 is mounted. The inner ends of members $d$ are secured to bracket $d^2$ which are pivotally supported by a horizontal shaft 49 which is supported in bearings formed in housing-bracket 47. Bearings $b'$ are each provided with an integral upstanding arm 50. Each arm 50 is connected to bracket 43 by a truss-rod 50$^a$. The upper ends of arms 50 are pivotally connected to the housing-bracket 47 by links 51, the outer ends of which are pivotally connected by pins 52 to the upper ends of arms 50, respectively. The inner ends of links 51 are connected to a cross-shaft 53 which is journalled in bracket 47. Links 51 are parallel to members $d$, and with arms 50, maintain the horizontality of jib B and arm C when arm D is pivotally raised or lowered on the axis of shaft 49. Links 51 and member D swing in parallel planes.

The machine is equipped with mechanism for feeding sand to the projector from an overhead supply. An endless conveyor belt M is driven by suitable gearing from an electric motor $m$ and extends over and swings laterally with jib B and discharges sand into a chute $m^2$ over an endless conveyor belt $m^3$ which is mounted on and swings laterally with, and extends over arm C and delivers sand into the inlet opening in the inner side of the casing $a$ of the sand projector A. The endless belt M is supported in a frame, which has its inner end pivotally supported in a bracket $m^5$ fixed to the upper end of housing-bracket 47 and its outer end supported from jib B by rods $m^4$, so that the outer end of the belt will rise and fall with the jib. Belt $m^3$ is supported in a frame carried by arm C and is driven by suitable gearing (not shown) from motor $a^2$ which drives the projector.

A hydraulic device is provided for pivotally raising and lowering arm D to raise or lower jib B, arm C and projector A for projecting sand into flasks of different heights. This device comprises (Fig. 4) a cylinder 54 which is provided with transversely coaxial trunnions 55 which are pivotally supported in bearings 56. Bearings 56 are integrally formed with housing-bracket 47 and pivotally support cylinder 54 from and for horizontal swinging with said bracket. A piston 57 is slidable vertically in cylinder 54 and is operable by oil under pressure forced into the lower part of the cylinder and retained therein to hold the piston in its assigned position. The upper end of stem 58 of piston 57 has fixed thereto a saddle 59 which engages crossed truss-rods 60, the ends of which are secured to bracket $d'$ and brackets d$^2$. When piston 57 is raised in cylinder 54 by oil under pressure, stem 58 will shift saddle 59 upwardly and through truss-rods 60 swing jib-member D at shaft 49 to bodily raise the shaft 48 and arms 50 which support the jib B. Links 51 and members $d$ retain the jib B and arm C horizontal. When oil is exhausted from cylinder 54 the load of sand on the jib will lower piston 57. The supporting arm C will be lowered with the jib according to the volume of oil exhausted from the cylinder. This exemplifies a hydraulic device for raising and lower the jib and arm which support the projector and are pivoted for horizontal swinging movements. Heretofore it has been the practice to use a cable and drum for raising and lowering the jib. An objection to the use of a cable is that breakage of the cable results in sudden dropping of and damage to, the supporting structure. When hydraulic mechanism is used for this purpose and leakage occurs, the dropping of the supporting structure will be gradual and no breakage or damage will result.

The hydraulic mechanism for rotating the sleeve 44 and housing 47 which support the jib B and arm C, for horizontal movement of the projector A in any direction, comprises (Figs. 2, 4 and 6) a pair of stationary cylinders E, E' which are supported by a housing 61 which is fixed to one side of the standard 46 and pistons $e$, $e^1$ slidably mounted in said cylinders, respectively. A gear $e^2$ is keyed to sleeve 44 and stems of pistons $e$, $e^1$ are connected to gear-racks $e^3$, $e^4$ which mesh, respectively, with gear $e^2$ on opposite sides thereof. Cylinders E, E' have connected thereto pipes 84 and 85 respectively, for delivering oil under pressure thereto and exhausting it therefrom. For rotating sleeve 44 and the jib B and parts carried thereby in one direction, oil under pressure is delivered to cylinder E and simultaneously exhausted from the cylinder E' so that racks $e^3$, $e^4$ will be operated in opposite directions. When sleeve 44 and the projector supporting structure is to be rotated in the opposite direction, oil under pressure will be delivered into cylinder E' and simultaneously exhausted from cylinder E. Shoes 62 adjustably carried by screws 64, engage the racks $e^3$, $e^4$ to retain them in mesh with gear $e^2$. Tubular hoods 63 enclose the ends of racks $e^3$, $e^4$.

The mechanism for swinging arm C horizontally on its pivotal connection with and relatively to jib B comprises (Fig. 10) a cylinder $a^5$ which is fixedly secured to the inner end of housing 43, which is rigid with the jib B, a piston $a^6$ slidably mounted in cylinder $a^5$ and a gear-rack $a^7$ which meshes with a gear 65 which is fixed to the spindle 41. Rack $a^7$ is fixed to the stem $a^8$ of piston $a^6$. When fluid under pressure is delivered into one end of cylinder $a^5$ and exhausted from the other, piston $a^6$ will be shifted to operate the rack $a^7$ and rotate gear 65 in one direction to correspondingly swing arm C relatively to jib B. When oil under pressure is delivered into the opposite end of cylinder $a^5$ and exhausted from the other as hereinafter described, rack $a^7$ will be operated to rotate arm C horizontally in the opposite direction. Rotation of jib B alone will cause arm C to be moved horizontally with the jib. Pivotal movement of the arm C relatively to jib B causes the projector to be swung relatively to the jib. By compounding the pivotal movements of the jib and arm, the projector may be shifted to ram sand within the range of movement of the projector permitted by the jib and arm.

The apparatus for constantly supplying oil under pressure to cylinders E, E' for swinging jib B and to cylinder $a^5$ for swinging arm C comprises a closed tank 66 (Fig. 4) supported on a plate 67 which is supported from standard 46. This tank is adapted to contain a supply of oil for delivery to the shifting mechanisms and the control valves, hereinafter set forth, and to receive oil therefrom. This apparatus also comprises an electric motor 68 mounted on plate 67 and a rotary pump 69 driven by motor 68 and adapted to deliver oil under high pressure, for example 350 to 750 pounds per square inch, to the hydraulic shifting mechanisms for the jib B and arm C and also for operating piston 57 to raise or lower arm D. The pump is preferably of the constant-pressure type and provided with variable vanes for varying the volume of delivery to maintain a predetermined pressure in the oil lines. The intake of the pump 69 is connected by a pipe 70 to draw oil from tank 66.

The pipe connections for delivering oil under pressure from pump 69 to the cylinder $a^5$ for horizontally shifting arm C and to cylinder 54 for vertically swinging arm D, the return-connections from said cylinders, and for delivering oil under pressure to, and returning it from, the control valves mounted on jib B are adapted to maintain their communication with the pump 69 and tank 66 during all horizontal swinging movements of the jib B and arm C. For this purpose a swivel-assembly (Figs. 15 and 16) is provided in housing 47. This assembly comprises a core 71 which is stationarily supported and is held against rotation by the delivery and return pipe which extends vertically and centrally through sleeve 44 and a tubular shell 72 which is supported from the lower end of the fixed member of the lower bearing 45 in standard 46 (Fig. 4). Core 71 fits in a cylindrical casing 73 which is provided with a flange 74 which is fixedly supported on a wall in bracket 47 so that the casing will rotate horizontally with jib B. A pipe 75 is connected to the pressure side of pump 69, extends upwardly through shell 72, and is connected to a vertical port 76 which communicates with an annular channel 76a in the periphery of core 71 to deliver oil under pressure to a pipe 78, which is connected to casing 73 and communicates with said channel in all relative positions of the casing 73 and core 71. An oil return-pipe 79 which discharges into tank 66, is connected to a port 80 in core 71 which communicates with an annular channel 80a to receive oil from a return pipe 81 which is connected to casing 73 and communicates with said latter channel in all relative positions of the casing 73 and core 71. A ball bearing 93 is provided between the upper end of core 71 and a closure 94 which is threaded to the upper end of casing 73. A port 95 extends from the upper end of the core to the return port 80 so that any oil which leaks upwardly between core 71 and casing 73 will be returned through port 95 to the return port 80.

The swivel assembly also comprises connections for oil between a valve F which controls the flow of oil to and from the cylinders for shifting the jib B and a pilot valve G mounted on the jib. These connections include a pipe 86 connected to valve F and to a port 86a in core 71. Port 86a communicates with an annular channel 90 in core 71. A pipe 88 connects pilot valve G and casing 73 and communicates with channel 90. A second pipe 87 connects valve F and a port 87a in core 71. A third pipe 89 connects the pilot valve G and casing 73 and communicates with an annular channel 91 in core 71 to which port 87a is connected.

The valve F controls the swinging of the jib B in either direction and is controlled by a pilot valve G which is mounted on the jib. Pilot-controlled valve F is mounted adjacent the standard 46 and comprises a casing $f'$, and a valve piston $f$ is provided to control the delivery of oil to, and its return from, the cylinders E, E2 for shifting jib B in opposite directions. A branch 82 of pipe 75 delivers oil under pressure into the casing $f'$ of this valve. A pipe 83 leads from valve-casing F to return pipe 79 for returning oil to tank 66. Valve piston $f$, controls the flow of oil under pressure through a pipe 84 to one end of cylinder E' and the opposite end of cylinder E for swinging the jib B in one direction and, through a pipe 85 which is connected to the outer end of cylinder E' and the inner end of cylinder E for delivering oil for swinging the jib B in the opposite direction. The pipes 84 and 85 alternately deliver oil to, and return it from cylinders E, E' to the casing of valve F, under control of valve-piston f. Valve F is adapted to deliver substantially full pressure of oil to the cylinders E, E' under control of the pilot valve G and to graduate the return flow from said cylinders and to control the speed of movement of the jib B. The movements of the valve-piston f are controlled by oil delivered through small pipes in the long reaches between the pilot valve G and the casing f'. The valve-piston f (Fig. 17) is held normally closed and centered in the valve-casing f' by springs 96 which are interposed between shoulders adjacent and on the opposite ends of valve-piston f and abutments 97 respectively. Each abutment 97 is adjustable to vary the tension of its spring by means of a screw 98 which is threaded to a screw-plug 99 in one of the ends of the casing f' of valve F. When valve-piston f is centralized the flow of oil between the pressure-pipe 82 and pipes 84 and 85 which lead to cylinders E, E', will be cut off by cylindrical portions 101 and 102, respectively, so that the pistons in said cylinders will remain in the positions to which they have been shifted. Pipe 82 delivers oil to an annular chamber 100 around the reduced central portion of piston-valve f between portions 101 and 102. This chamber is normally closed by portions 101 and 102 of valve-piston f, and the pressure of oil from pipe 82 on the sides of portions 101 and 102 of valve-piston f is normally balanced. Portions 101 and 102 of the piston-valve normally cut off communication between chamber 100 and the ports in casing f' which lead to pipes 84 and 85, respectively. When valve-piston f is shifted in either direction, it will establish full pressure communication between the oil in chamber 100 and one of the pipes 84, 85 according to the direction in which the valve-piston f is shifted. The outer end of each of the cylindrical portions 101 and 102 is slightly tapered, as at 101ª and 102ª. These tapered portions alternately control the return flow of oil from cylinders E, E' so as to graduate the reduction of pressure of the oil, thereby controlling the rate of motion of pistons e, e' and the rate of swing of jib B. Tapered portions 101ª, 102ª alternately control the return flow of oil from either of the pipes 84, 85 to channels 103 formed around reduced portions of the valve-piston, respectively. A port 104 in casing f' cross-connects channels 103 and this port is connected to pipe 83 for returning oil to the tank 66. Valve-casing f' is provided at each end with an oil-chamber 106 to which pipes 86, 87 are respectively connected. These pipes 86, 87 are respectively connected through the swivel-assembly to pipes 88 and 89, which are connected to the pilot-valve G which is adapted to alternately control the outflow of oil under pressure through said pipes from the chambers 106 at opposite ends of the valve-casing f'. Provision is made for delivering oil under pressure in small quantities from chamber 100 in casing f' to chambers 106 through radial ports 107 and a longitudinal port 113 in valve-piston f. The valve-piston f is operated responsively to the flow of oil through the pilot-valve G to unbalance the pressure against the ends of said piston. This flow to and from the pilot valve G is restricted by ports 108 in screw-plugs 109 which are threaded into the stem of valve-piston f and plates 110 fixed to the inner ends of the plugs and provided with a restricted orifice 111 (Fig. 18). Oil under pressure flows from pipe 82 through port 107 and 113 through orifices 111 in plates 110 and ports 108 in plugs 109 to the chambers 106 and pipes 86, 87, respectively, which are connected to the pilot-valve G through the hydraulic swivel assembly and pipes 88 and 89. When oil is exhausted through the pilot-valve G from one of the pipes 86, 87, the pressure in one end of the casing f' will be reduced so that the pressure of oil in the other end will operate valve-piston f to deliver oil under pressure to one of the pipes 84, 85 for operating the hydraulic mechanism for shifting jib B in one direction. When the pilot-valve G is closed, oil under pressure from port 107 will restore the pressure in the chambers 106 and the pipes 86, 87 through which the pressure has been reduced until it is equal to the pressure in the chamber 106, in the opposite end of casing f', allowing springs 96 to shift valve-piston f to its neutral position. Through the pilot-valve G, oil pressure in either of the pipes 86, 87 may be reduced to move valve-piston f' in opposite directions and control the direction of the swinging of the jib B. The valve F exemplifies a proportional valve whereby the movements of the valve-piston f are slowly and accurately controlled to control the flow of oil under pressure from pipe 82, through valve-casing f', to either of the pipes 84, 85 for operating the pistons in cylinders E, E' in opposite directions and also makes it possible to use small pipes for the flow of oil to control the movements of piston valve f.

A by-pass valve 84ª for permitting a small amount of oil to flow directly between pipes 84 and 85 cushions the swinging movements of the arm so that when the control lever, hereinafter described, is suddenly returned to neutral, the momentum of the arm and the load carried thereby will be smoothly decelerated.

The pilot-valve G for controlling the operation of the valve F is mounted to swing with jib B and comprises (Figs. 21 and 23) a casing g provided with a cylindrical bore $g^2$ and a valve-member $g'$ rotatably mounted on the bore. An outlet pipe 115 is connected to the bottom of the casing $g'$ and to the oil-return line 81. Valve $g'$ is provided with oppositely disposed segmental cylindrical closure surfaces 116, one of which normally closes the port in casing $g$ which communicates with pipe 115, and the other of which limits the communication between the pipe 115 to either side of member $g'$. Valve-member $g'$ is provided with annular channels 117 which communicate with the ports in casing $g$ to which pipes 87 and 88 are connected respectively. Between channels 117 the valve-member $g'$ is provided at diametrically opposite points with cut-away portions 118 which communicate with eccentric circumferential cut-away portions 119 between closure surfaces 116, which are circumferentially aligned with the closure-faces 116. Eccentric cut-aways 119 are of gradually increasing depth to graduate the flow of oil when the valve is opened. An arm 120 is adjustably secured to the stem $g^5$ of valve-member $g'$ and is adapted to shift it from its neutral position in either direction. Normally, surface 116 of valve-member $g'$ will close communication between the casing $g$ and return-pipe 115. When valve-member $g'$ is rotated in one direction, fluid from pipe 87 will flow across one cut-away 118 to eccentric cut-away 119 to return pipe 115 and return oil from one end of valve F through return-pipe 115 to the return pipe 81 to the tank 66, while the exhaust of oil from pipe 88 will remain cut off by the closure surfaces 116. When valve-member g' is rotated in the opposite direction oil will be exhausted from valve F through pipe 88 and the flow through pipe 87 will be cut off by closure-surface 116. This exemplifies a pilot-valve for proportionately controlling the operation of the valve F by graduated flow to control the swinging movements of jib B by fluid under pressure in cylinders E, E'. This pilot-valve is mounted on the top-wall of a box 121 which is fixed to bracket 43 so that the valve will swing with jib B.

The valve H for controlling the operation of the piston $a^6$ in cylinder $a^5$ for swinging the arm C in either direction (Figs. 19 and 20) is mounted in box 121 which swings with jib B. Valve H comprises a casing $h$, a valve-piston $h'$ slidably mounted in a cylinder in the casing and provided with a central annular channel $h^2$ and a stem $h^5$ for reciprocating the valve-piston. This channel $h^2$ communicates with the pressure-pipe 78. Cylindrical portions $h^3$ of the valve-piston at the ends of the channel $h^2$ normally cut off the flow of oil under pressure to pipes 122 and 123 which are respectively connected to the opposite ends of cylinder $a^5$ to operate its piston $a^6$ in either direction so as to operate rack $a^7$ to swing arm C in either direction. When valve-piston $h'$ is shifted in one direction, it will establish communication between one of the pipes 122, 123, and the pressure line 78 to deliver oil under pressure into one end of the cylinder, and simultaneously permit outflow of oil from the other of said pipes to reduce the pressure in the other end of the cylinder. A branch of return-pipe 81 is connected to a duct 125 in casing $h$ which communicates with the ends of the cylinder in said casing. When valve-piston $h'$ is centralized it will cut off communication between pressure-pipe 81 and pipes 122 and 123. When valve-piston $h'$ is shifted in either direction, one cylindrical portion $h^3$ will permit oil under pressure to flow from channel $h^2$ to one of the pipes 122, 123, and the other of the cylindrical portions $h^3$ will open communication between the other of said pipes and return-port 125 so that oil will be forced into one end of the cylinder and the pressure will be reduced in its other end. When the valve-piston $h'$ is shifted in the opposite direction, the flow of oil under pressure and the exhaust will be reversed to operate piston $a^6$ in the opposite direction. The valve-piston is provided with conical portions $h^4$ for graduating the reduction of pressure to control the rate of movement of arm C. A needle-valve J is included in a pipe between pipes 123 and 122 to cushion the movements of the piston $a^6$ and arm C.

A valve I (Fig. 24) controls the flow of oil under pressure into the lower end of cylinder 54 and under piston 57 to vertically swing member D for raising and lowering the jib B, arm C and projector A. This valve I comprises a casing $i$, a valve-piston $i^2$ slidably mounted in a cylinder $i^1$ in the casing, and springs $i^4$ for normally centering the piston. A branch 126 of pressure pipe 78 is connected to casing $i$ to deliver oil under pressure into an annular channel $i^3$ in and between cylindrical sections $i^5$ of valve-piston $i^2$, and a pipe 127 which is connected to deliver oil under pressure into the lower end of cylinder 54. When valve-piston $i^2$ is in its normal and centralized position, communication between branch-pipe 126 and pipe 127 will be cut off and the oil in cylinder 54 will be retained therein to hold arm D against vertical movement. A pipe 128 is connected to one side of the cylinder in casing $i$ and to return-pipe 81 for discharging oil from cylinder 54 under control of the valve-piston $i^2$. Normally, valve-piston $i^2$ is in its centralized position and sections $i^5$ cut off communication between pipes 126 and 127. A stem 129 on valve-piston $i^2$ is adapted to impart sliding movements to said piston. When the valve-piston $i^2$ is shifted in one direction from its normal position it will deliver oil under pressure from pipe 126 through channel $i^3$ to pipe 127 into cylinder 54 to raise piston 57 and the arm D. When the valve-piston $i^2$ is shifted in the opposite direction, it will permit the oil from cylinder 54, which is subjected to pressure by the piston 57 and the load thereon, to escape through branch-pipe 128 and pipe 81 to tank 66. Valve I is mounted on bracket 47 so it will swing horizontally with the jib B. An electric motor 130 controls the movements of valve-piston $i^2$. The shaft of this motor is provided with an arm 131 which is adapted to move between fixed limit stops 132 and 133 and connected by a link 129a to stem 129. Motor 130 is of the reversible type and when it is supplied with current for operating its rotor in one direction, it will shift arm 131, link 129a and stem 129 to move valve-piston $i^2$ against the force of one of the springs $i^4$, into position to supply oil under pressure through pipe 126 to pipe 127 into the lower end of cylinder 54. When motor 130 is reversed, it will shift arm 131 and stem 129 to shift valve-piston $i^2$ in the opposite direction against the force of the other spring $i^4$ and into position to discharge oil from cylinder 54 through the valve-casing $i$ and around one end of the valve-piston $i^2$ to return pipes 128 and 81 to tank 66. Pipe 127 includes a hose-section for permitting the cylinder 54 to swing on its trunnions 55 during the raising and lowering movements of arm D. A pipe 134 is connected to the upper end of cylinder 54 and return-pipe 128 to permit any oil which leaks around piston 54 to flow to the return-pipe 81. The motor 130 is controlled by a switch-button 135 which is placed in convenient reach of the operator. As long as current is supplied to motor 130 it will hold arm 131 against one of the stops 132, 133, according to the direction in which the rotor of said motor is shifted. As soon as current is cut off, springs $i^4$ will restore piston $i^2$ and arm 131 to their respective normal or centralized position and cut off communication between pipe 127 and pipes 126 and 128, and confine the oil in cylinder 54 so it will hold piston 57 in the position in which it has been shifted by the increase or decrease of the volume of oil in said cylinder, and cause the jib B, arm C and projector A to remain at the desired height.

To enable the operator to fully observe the sand discharged into the flask so he can move the projector to uniformly and quickly build up the sand and distribute it into all portions of the flask, a seat K for supporting the operator is mounted on the outer end of arm C so the operator will travel with the projector, and a manually operable lever L for controlling the pilot valve G and the valve H for controlling the hydraulic shifting devices for jib B and arm C is also mounted adjacent the seat. A bracket $k$ is supported from the casing of the sand-projector A. Foot-rests $k'$ are provided for the operator.

The invention contemplates the control of the hydraulic devices for swinging the jib B and arm C by a single element which is supported to move with the projector, such as a lever L, to control the speed, direction and extent of horizontal movements of the projector and the individual, and compounding of the shifting movements of the jib B and arm C. This lever is mounted at the outer end of arm C and the lever and the operator will be moved horizontally in all directions with the projector, and is adapted to shift devices for operating valves G and H which are mounted to move with the jib B. Lever L is operated as a "joy-stick" and is mounted for universal pivotal movement to control both of the valves G and H for controlling the operation of the hydraulic shifting devices to swing the jib B on its axis, and to swing the arm C relatively to the jib to move the projector in any direction around the supporting standard 46. Connections are provided for lever L whereby movement of its handle l longitudinally of arm C, will control the operation of the hydraulic device for swinging the jib B. Transverse pivotal movement of handle l will control the pivotal movements of arm C relatively to and on the jib B. Compounding these movements will correspondingly control said devices to compound their actions to move the projector into any angular direction for delivery of sand into all portions of a large flask. Lever L is supported on a box 136 (Fig. 13). A tube 136$^a$ spaces the box 136 from housing 40$^a$ which is carried by the spindle 41 and rotates with arm C. Box 136 is also supported in seat-supporting bracket $k$ by a stud 137 which is slidable in a rubber cushion 138. Lever L is fulcrumed for universal pivotal movement relatively to box 136 by a collar 139 which is fixedly secured to and above the lower end of the lever and is provided with an upstanding annular rim or bead 140 which seats in an annular groove 141 which is semi-circular in cross-section, formed in the underside of the top-wall of box 136. Groove 141 forms a seat for the bead 140 on which the lever can rock angularly in any direction. A coil-spring 142 between the top of box 136 and a shoulder 143 on lever L, serves to normally hold lever L in its centralized position and to return it to such position when it is released by the operator. A shaft 144 extends longitudinally through tube 136$^a$ and its outer end is connected by a transverse pivot-pin 145 to a fork $l^3$ fixed on the lower end of lever L. This shaft is formed of sections and comprises an outer section which is pivoted to fork $l^3$, an inner section 158 and a tube 144$^a$ between said sections. Rotation of shaft 144 approximately on its own axis by transverse movement of lever-handle l controls the operation of valve H for effecting the pivotal movement in either direction of arm C, correspondingly to the direction in which the handle is shifted on its vertical pivot to jib B. Longitudinal movement of shaft 144 by movement of handle l longitudinally of arm C controls the pilot-valve G for controlling the valve F for the hydraulic device for swinging the jib B according to the direction in which the handle is shifted.

The connection for shifting the arm 120 of the pilot-valve G responsively to longitudinal movement of shaft 144 comprises a rod 146 which is connected by a universal joint 147 to arm 120 of pilot valve G (Fig. 21) and is pivotally connected to the transverse arm of a horizontally shiftable bellcrank lever 148 (Fig. 8) which is pivoted at 149 in box 121, a link 150 pivoted to the longitudinal arm of lever 148, and to a lever 151, the inner end of which is fulcrumed at 152 (Fig. 9) to a bracket 153 fixed to the top of box 121. Lever 151 is preferably formed of square tubing. A forked bracket 154 (Figs. 9 and 13) is fixed to the top of the outer end of lever 151. A rotatable sleeve 155 (Fig. 14) extends into the top and bottom arms of brackets 154. A bearing-block 156 between the arms of bracket 154 comprises a vertically extending housing 157 containing sleeve 155 for pivotally connecting bracket 154 on lever 151 and block 156 for relative horizontal swinging. Section 158 of shaft 144 is journaled and secured against longitudinal movement in bearing-block 156. Normally lever 151 is in its central position and the pilot valve G is closed. When shaft 144 is shifted longitudinally in either direction by the shaft of lever-handle l longitudinally of arm C, said shaft will shift bearing-block 156 correspondingly, and shift sleeve 155 and the outer end of lever 151 by a toggle action to operate valve-member $g'$ of the pilot valve G responsively to the direction in which rod 144 is shifted by handle l. When lever-handle l is pushed away from the operator, shaft 144 will shift block 156 to swing lever 151 to shift the pilot-valve G to control valve F to swing jib B in one direction, and when the lever is shifted from its normal position in the opposite direction longitudinal movement of shaft 144, the pilot-valve G will be controlled to operate the cylinders E, E' to shift jib B in the opposite direction. Lever 151, when lever L is released, is shifted to its centralized position to automatically restore the pilot-valve into its normal position upon release of the lever. This is effected by a pair of springs 169 (Figs. 14 and 15) coiled around studs 170 which are fixed to the arms of a forked bracket 171 which is fixed to the outer end of lever 151. Springs 169 engage abutment washers 172 which are adjustably held on studs 170, respectively, and normally engage angle brackets 173 which are fixed to housing 43 and are free to move away from brackets 173 when lever 151 is shifted. Rollers 174 mounted on bracket 171 ride in a channeled track 175 to guide the outer end of lever 151 horizontally and transversely. This exemplifies means for controlling the pilot-valve G to control the valve F for operating the pistons in cylinders E, E' in opposite directions by corresponding movements of the lever L to effect longitudinal movement of rod 144. Spring 142, when lever L is released, rocks said lever and rod 144 to their normal positions to close valve H which controls the movements of piston $a^6$ in cylinder $a^5$ for the swinging movements of arm C.

The connection for operating valve H to control the operation of the piston $a^6$ in cylinder $a^5$ for swinging arm C laterally relatively to the jib B, comprises an arcuate gear 160 (Fig. 12), which is fixed to the shaft 158 and confined sidewise in a pocket 161 in block 156, and a shaft 162 which is vertically slidable in sleeve 155 which is rotatable in bracket 154 and is provided with gear-teeth which mesh with gear 160. Rotation of shaft 158 on its own axis by transverse tilting of lever L will rock gear 160 to raise or lower shaft 162. Shoes 163 fit in an annular groove 164 in the lower end of shaft 162 so they will be raised and lowered with the shaft, while permitting rotation of said shaft relatively to the shoes and are provided with trunnions 165 which are pivoted in the outer end of the horizontally extending arm of a bell-crank lever 166, which is pivoted at 167 in lever 151. The vertical arm of lever 166 has pivotally connected thereto a rod 168 which includes universal joints, and is connected to the stem $h^5$ of the valve H which controls the flow of oil to and from the cylinder $a^5$ for swinging arm C in opposite directions. The connection between slidable shaft 162 which is operable by rotation of rod 144 and the stem $h^5$ of valve H are mounted on lever 151 so that the movements of the piston-valve $h'$ of valve H and the operation of the pilot valve G by lever 151, may be compounded to any extent desired. The connection operated by shaft 162 remains operative in all positions of lever 151 so that the arm C may be swung in any angular position of jib B.

The operation of the machine will be as follows: normally motor 68 will be operated to continuously drive the pump 69 while the projector is being operated. The pump is provided with a suitable pressure-regulating device to maintain the desired pressure in the oil-lines and irrespective of the rate of delivery of oil up to the maximum capacity of the pump. The constant pressure of say 350 to 750 pounds per square inch is maintained in the pump lines. While lever L is released and held in its normal vertical position by spring 142, the connections for operating the pilot-valve G which controls the swinging of the jib B and valve H which controls the swinging of the arm C, will be positioned to close said valves so that the hydraulic devices will be static and the jib and arm will remain in any position to which they have been shifted. When it is desired to move the projector over the flask by swinging the jib B to the right, the operator on seat K will shift handle $l$ of lever L forwardly and hold it in its shifted position until the jib has been shifted to the point desired. The extent of this angular movement of lever L regulates the range of movement of the member $g'$ of pilot valve G and controls the speed of the movement of the jib. This movement of lever L will pull rod 144 outwardly and, through the toggle action between bearing-block 156, sleeve 155 and bracket 154, swing lever 151 in such direction that link 150, bellcrank lever 148, and rod 146 will rock arm 120 to shift the rotary member $g'$ in pilot-valve G and deliver oil to shift valve-piston $f$ of valve F to deliver fluid through pipe 85 into the opposed ends of cylinders E, E' and operate racks $e^3$ and $e^4$ in opposite directions to rotate gear $e^2$ and swing jib B to the right. Simultaneously valve-member $f$ of valve F will permit graduated return of oil from the opposite ends of cylinders E, E' through pipe 85 to the return-pipe 83. As soon as the lever is released, the pilot-valve G and valve F will be restored to closed position and the movement of the pistons $e$, $e'$ in cylinders E, E' will stop. Movement of lever L toward the operator will shift valve-member $g'$ of pilot-valve G to deliver oil under pressure through pipe 85 into opposed ends of cylinders E, E' to permit the outflow of oil from the opposite opposed ends of the cylinders through pipe 84 to shift the jib B to the left. When it is desired to swing the arm C relatively to jib B to the right, the operator will transversely move handle $l$ of lever L, to the right, which will cause said lever to rock rod 141 and turn gear 160 to slide shaft 162 upwardly in sleeve 155. This movement of shaft 162 will swing bellcrank lever 166 and shift rod 168 inwardly to slide the valve-piston $h'$ of valve H to deliver oil under pressure from pipe 78 through channel $h^2$ in valve-piston $h'$ to pipe 122 to cylinder $a^5$ and operate piston $a^6$ and rack $a^7$ to rotate gear 65 which will rotate arm C to the right of the jib. When lever L is released spring 142 will rock rod 144 to close valve H. When handle $l$ of lever L is shifted to the left, rod 144 will be rocked in the reverse direction and shift valve-piston $h'$ to deliver oil under pressure through pipe 123 to cylinder $a^5$ and operate the piston $a^6$ to swing arm C to the left. During these operations of valve H, it will control the gradual reduction of pressure in one end of the cylinder $a^5$, through pipes 124 and 81 simultaneously with delivery of oil to said cylinder.

Lever L, being universally pivoted, may be shifted forward and back, transversely or angularly, in any direction. When the lever is shifted in other than a true fore and aft or transverse direction, the rocking and longitudinal movement of rod 144 will be compounded to control both the pilot-valve G for controlling the shift of jib B and the valve H for controlling the swinging of arm C. The movements of rod 144 will be compounded responsively to the variations in the angle of movement of lever L so that if the handle $l$ is shifted forwardly and laterally to the right at an angle of 45°, the relative movements of the jib and arm will be such that the projector will move substantially in the direction of the movement of the handle. Similarly the shift of the lever in different angles will control the pilot-valve and valve H to control the movements of the projector in the same angular direction in which the handle $l$ of lever L is shifted. When the handle is shifted in any angular direction to compound the movements of the jib B and arm C and is released, the handle will be restored to its normal position by spring 142 and springs 169 will restore lever 151 to its normal position so that the projector may be arrested at any point desired. In the event that the jib B and arm C should be shifted to their dead center position, the arm C can be independently swung slightly to render the lever 151 shiftable by longitudinal movement of shaft 144, but in practice this very seldom occurs.

In practice it has been found that hydraulic devices respond quickly to the movement of the control lever to move the projector horizontally in any desired path or position. In the operation of these projectors, the projector is usually kept moving continuously in varied or irregular directions in ramming flasks. Hydraulic controls, such as pilot-valve G and valves F and H, while being continuously operated, avoid wear which results when other types of control mechanism are used. The guiding or shifting of the projector is simple and convenient because it responds to the direction of movement of the handle $l$ of lever L, so that the sand will be rammed as required in filling flasks with patterns of a wide diversity of shapes. The operator is seated at the outer end of the jib-supported arm where he can follow the projector and can readily and easily observe the accumulation of the sand in the flask and shift the projector for the proper distribution of the sand. The valves are adapted to graduate the flow of oil under pressure for gradual operation of the jib and arm and are proportional to the extent of movement of the lever L in any direction so that the speed of the movements of the jib and arm may be readily controlled by the operator. In practice, the mechanism illustrated and described has been found to greatly expedite the movements of the projector over the flask and has made it possible to use a projector of high capacity to expedite the ramming of the flasks.

The invention is not to be understood as restricted to the details set forth, since these may be modified within the scope of the appended claims, without departing from the spirit and scope of the invention.

Having thus described the invention, what we claim as new and desire to secure by Letters Patent is:

1. The combination with a rotary power-driven projector, a structure for supporting the projector to move horizontally in any direction so the projector will ram sand in all portions of a flask, and a plurality of hydraulic devices for horizontally shifting the projector in different directions horizontally, of a manually operable lever supported for universal pivotal movement, valves for controlling the operation of said devices respectively, and connections between the lever and the valves for operating the valves singly or compoundly, to control the single or compound operation of said devices for shifting the projector horizontally in any direction and so it will be shifted in substantially the same direction as the lever is shifted.

2. The combination with a jib pivoted to swing horizontally, an arm pivoted on the distal end of the jib to swing horizontally, a rotary projector supported on the distal end of said arm, an operator's support on the distal end of the arm, and devices for shifting the jib and arm, of control means for said devices respectively, manually operable means mounted adjacent the distal end of and movable with the operator's support and said arm, and connections between the manually operable means and said control-means whereby the operator on the support can control the operation of said devices.

3. The combination with a jib pivoted to swing horizontally, an arm pivoted on the distal end of the jib to swing horizontally, a rotary projector supported on the distal end of said arm, an operator's support on the distal end of the arm, and devices for shifting the jib and arm, of control means for said devices respectively, mounted on and movable with the jib, manually operable means mounted adjacent the distal end of and movable with the operator's support and said arm, and connections operable by the manually operable means for operating said control-means to singly or conjointly operate said devices, said manually operable means being within reach of an operator on the support.

4. The combination with a jib pivoted to swing horizontally, an arm pivoted on the distal end of the jib to swing horizontally, a rotary projector supported on the distal end of said arm, an operator's support supported at the distal end of the arm, and devices for swinging said jib and arm, of control means for said devices respectively, a manually operable lever mounted adjacent the distal end of and movable with said arm and connections operable by the lever, for operating said control means to operate said devices singly or compoundly by varied movements of the lever.

5. The combination with a jib pivoted to swing horizontally, an arm pivoted on the distal end of the jib to swing horizontally, a rotary projector supported on the distal end of said arm, an operator's support supported adjacent the outer end of the arm, and hydraulic devices for swinging said jib and said arm, of valves for controlling said devices respectively, a variably shiftable lever mounted on the distal end of and movable with said arm, and connections operable by the lever for operating said valves singly or compoundly by varied movements of the lever, to operate the devices singly or compoundly.

6. The combination with a jib pivoted to swing horizontally, an arm pivoted on the distal end of the jib to swing horizontally, a rotary projector supported on the distal end of said arm, an operator's support carried by the outer end of said arm, a stationarily supported hydraulic device for swinging the jib, a hydraulic device mounted on the jib for swinging said arm, of valves for controlling said devices respectively, a lever mounted at the distal end of said arm, and connections operable by the lever for operating said valves to control the movements of the jib and arm by an operator on the support.

7. The combination with a rotary power-driven projector and a structure for supporting the projector to move horizontally so the projector will ram sand in all portions of the flask, a hydraulic device for swinging the structure comprising a pair of pistons and cylinders, of means for controlling the supply of fluid under pressure to said cylinders comprising a stationarily mounted valve, and a pilot valve mounted on and movable with the structure for controlling the stationary valve, a lever mounted on the structure and a connection between the lever and the pilot valve for operating the pilot valve to control the stationary valve.

8. The combination with a rotary power-driven projector and a structure for supporting the projector to move horizontally so the projector will ram sand in all portions of the flask, a hydraulic device for swinging the structure comprising a pair of pistons and cylinders, racks operated by the piston, a gear engaged by the racks, of means for controlling the supply of fluid under pressure to said cylinders comprising a stationarily mounted valve, and a pilot valve mounted on and movable with the structure for controlling the stationary valve, a lever mounted on and movable with the structure, and a connection between the lever and the pilot valve for operating the pilot valve to control the stationary valve.

9. The combination with a jib pivoted to swing horizontally, an arm pivoted on and to swing horizontally relatively to the jib, a power-driven projector supported on the distal end of the arm, a stationarily supported hydraulic device for swinging the jib, a hydraulic device mounted on the jib for swinging the arm relatively to the jib, a valve for controlling the stationarily mounted hydraulic device, a pilot valve mounted on the jib for controlling said stationary valve, a valve mounted on the jib for controlling the device for shifting the arm, a lever supported adjacent the projector, and operating connections between the lever and the pilot valve and the valve for controlling the device for swinging the arm.

10. The combination with a jib pivoted to swing horizontally, an arm pivoted on and to swing horizontally relatively to the jib, a power-driven projector supported on the distal end of the arm, a stationarily supported hydraulic device for swinging the jib, a hydraulic device mounted on the jib for swinging the arm relatively to the jib, a valve for controlling the stationarily mounted hydraulic device, a pilot valve mounted on the jib for controlling said stationary valve, a valve mounted on the jib for controlling the device for shifting the arm, a manually operable lever mounted on the arm, operating connections between the lever and the pilot valve and the valve for controlling the device for swinging the arm, a swivel assembly at the pivotal point around which the jib swings comprising a relatively rotatable core and casing, and pipe connections between the casing of the swivel assembly and the valves movable with the jib and stationary pipe connections connected to the core.

11. The combination with a jib pivoted to swing horizontally, an arm pivoted on and to swing horizontally relatively to the jib, a power-driven projector supported on the distal end of the arm, a hydraulic device for swinging the jib, a hydraulic device mounted on the jib for swinging the arm relatively to the jib, of a valve for controlling the device for shifting the jib, a valve mounted on the jib for controlling the device for shifting the arm, a lever supported on the arm adjacent the projector, and operating connections between the lever and the valve and the valve for controlling the devices for swinging the arm, said connections comprising a shaft rotatable and shiftable longitudinally by the lever, and means for operating one of the valves by rotary and the other valve by longitudinal movement of the shaft.

12. The combination with a jib pivoted to swing horizontally, an arm pivoted on and to swing horizontally relatively to the jib, a power-driven projector supported on the distal end of the arm, a hydraulic device for swinging the jib, a hydraulic device mounted on the jib for swinging the arm relatively to the jib, a valve for controlling the device for shifting the jib, a pilot valve mounted on the jib for controlling the valve for controlling the jib, a valve on the jib for controlling the device for shifting the arm, a lever pivoted for universal movement and supported on the arm adjacent the projector, a shaft movable with the arm and by the lever, and connections between the shaft and the pilot valve and the valve for controlling the device for swinging the arm.

MURRAY G. CLAY.
ELMER O. BEARDSLEY.